US011993615B2

(12) United States Patent
Ridenour

(10) Patent No.: US 11,993,615 B2
(45) Date of Patent: May 28, 2024

(54) ALTERING THERMOCHROMIC TRANSITION TEMPERATURE IN TRANSITION METAL ETHYLENEDIAMINE COMPLEXES BY SUBSTITUTIONAL DOPING OF ANIONIC SPECIES

(71) Applicant: The Government of the United States of America, as represented by the Secretary of the Navy, Arlington, VA (US)

(72) Inventor: James August Ridenour, Arlington, VA (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 0 days.

(21) Appl. No.: 17/961,585

(22) Filed: Oct. 7, 2022

(65) Prior Publication Data

US 2024/0116968 A1 Apr. 11, 2024

(51) Int. Cl.

*C08K 3/08* (2006.01)
*B41M 5/28* (2006.01)
*C07F 15/04* (2006.01)

(52) U.S. Cl.

CPC .................................. *C07F 15/045* (2013.01)

(58) Field of Classification Search

CPC ........... C07F 15/045; C08K 3/08; B41M 5/28
See application file for complete search history.

(56) References Cited

PUBLICATIONS

N.F. Curtis and Yvonne Curtis, Some Nitrato-Amine Nickel(II) Compounds with Monodentate and Bidentate Nitrate Ions, vol. 4, No. 6, Jun. 1965, 804-809. (Year: 1965).*

George Lisensky, An Open Inquiry Lab Experiment Preparing Bis(N,N-diethylethylenediamine) Nickel(II) Complexes, J. Chem. Educ. 2022, 99, 4154-4161. (Year: 2022).*

Lucy M. C. Luong, Mark A. Malwitz, Venoos Moshayedi, Marilyn M. Olmstead, and Alan L. Balch, Role of Anions and Mixtures of Anions on the Thermochromism, Vapochromism, and Polymorph Formation of Luminescent Crystals of a Single Cation, [(C6H11NC)2Au]+, J. Am. Chem. Soc. 2020, 142, 5689-5701 (Year: 2020).*

Pfeiffer, P; Glaser, H. J. Prakt. Chem. 1938, 151, 134.

(Continued)

*Primary Examiner* — Bijan Ahvazi

(74) *Attorney, Agent, or Firm* — US Naval Research Laboratory; Roy Roberts

(57) ABSTRACT

Tunable thermochromic materials comprise a metal salt with a varying proportion of two different anions and an organic ligand. Partial substitution via doping during the initial synthesis with a macro-structurally similar (generating an isostructural material) yet chemically different anion creates a material with altered thermochromic properties. For example, in bromide-doped bis(N,N'-diethylethylenediamine)nickel(II)) tetrafluoroborate; both the tetrafluoroborate (BF4-) and bromide (Br—) derivatives are isostructural. Substitution of BF4- for Br— causes a decrease in the materials' thermochromic transition temperature by approximately 10° C.

8 Claims, 2 Drawing Sheets

0%
5%
10%
25%
Max Wavelength (nm)
Maximum Wavelength (nm)
Heat Flow (mW)
Temperature (C)

(56) References Cited

PUBLICATIONS

Thermochromism in Copper(II) Complexes. Structures of the Red and Blue-Violet Forms of Bis(N,N-diethylethylenediamine)copper(II) Perchlorate and the Nonthermochromic Violet Bis(N-ethylethylenediamine)copper(II) Perchlorate. Grenthe, I.; Paoletti, P.; Sandstrom M.; Glikberg S. Inorg. Chem. 1979 18. 10. 2687-2692.

Ridenour et al., "Manipulation of the Thermochromic Transition Temperature in a Classic Metal-Organic Complex by Selective Anion Doping" Inorg. Chem. 2022, 61, 23, 8834-8842.

* cited by examiner

Figure 1:
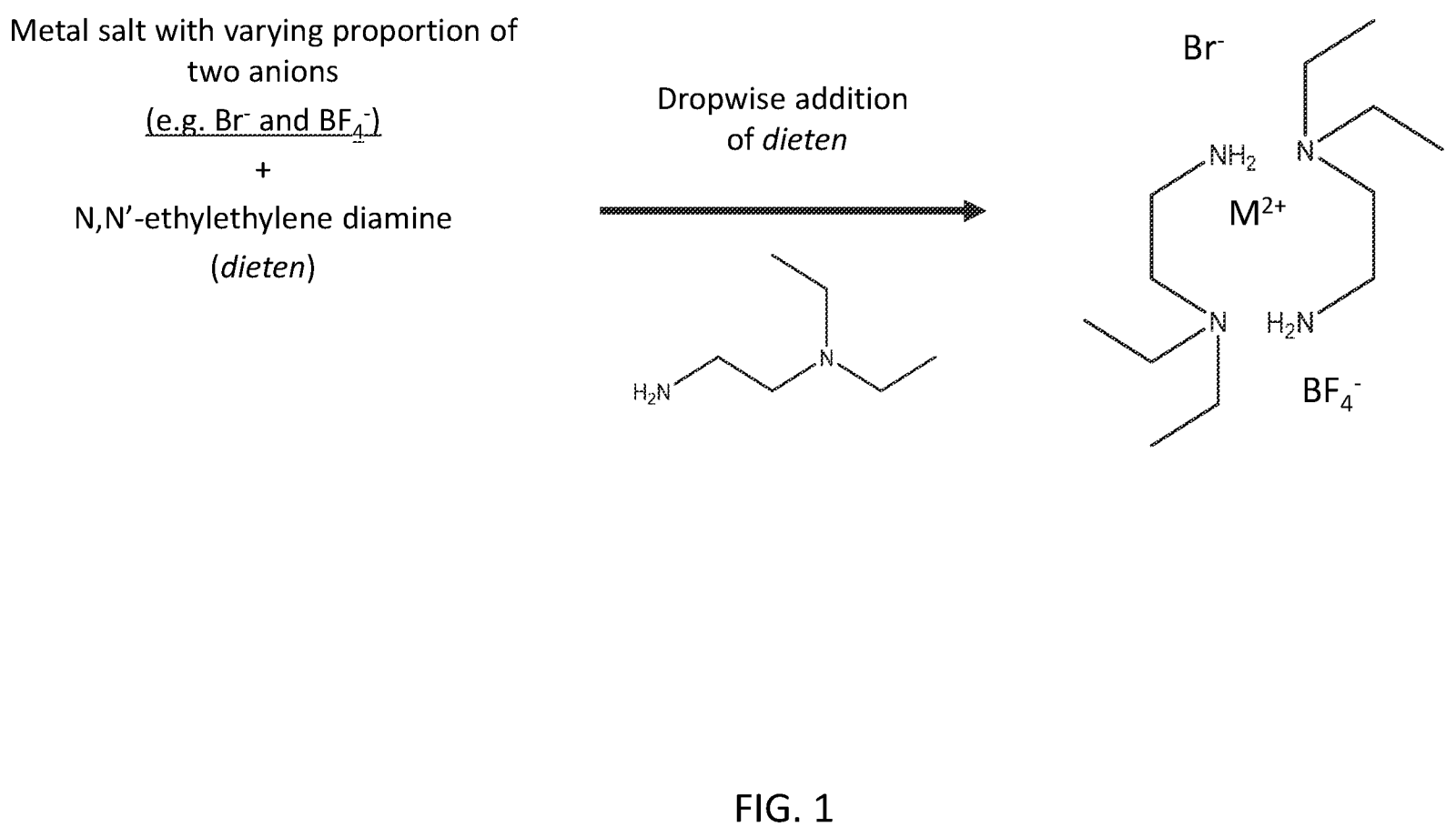

Metal salt with varying proportion of two anions (e.g. $Br^-$ and $BF_4^-$)

+

N,N'-ethylethylene diamine (*dieten*)

Dropwise addition of *dieten*

ALTERING THERMOCHROMIC TRANSITION TEMPERATURE IN TRANSITION METAL ETHYLENEDIAMINE COMPLEXES BY SUBSTITUTIONAL DOPING OF ANIONIC SPECIES

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 211,011.

CROSS-REFERENCE TO RELATED APPLICATIONS

None.

BACKGROUND

Thermochromism refers to a property whereby a substance changes color due to a change in temperature. The phenomenon finds numerous applications, for example: document security and protections, monitoring and advising changes relating to food safety, environmental uses like "smart windows," and novelties such as temperature-sensitive images on coffee mugs.

Many thermochromic inorganic materials utilize Hg, Tl, Cr, or other toxic heavy metals (e.g., lead perovskite). Moreover, transitions can occur at very cold (<−50° C.) or very hot (>350° C.) temperatures, and the transition is often not discrete, meaning it occurs gradually over 10s or 100s of degrees (e.g. Cr-doped $Al_2O_3$). Furthermore, transition temperatures tend to be relatively invariable.

Thermochromic materials include the family of metal complexes that contain divalent copper ($Cu^{2+}$) or nickel ($Ni^{2+}$), the dieten coordinating ligand (dieten=N,N'-diethylethylenediamine), and monovalent anionic species (e.g. bis(N,N-diethylethylenediamine)copper(II)) perhlorate). These have been documented by a number of research groups over the past several decades [see "Thermochromism in Copper(II) Complexes. Structures of the Red and Blue-Violet Forms of Bis(N,N-diethylethylenediamine)copper(II) Perchlorate and the Nonthermochromic Violet Bis(N-ethylethylenediamine)copper(II) Perchlorate." Grenthe, I.; Paoletti, P.; Sandstrom M.; Glikberg S. *Inorg. Chem.* 1979 18. 10. 2687-2692] since the initial discovery of this family [see Pfeiffer, P; Glaser, H. J. Prakt. Chem. 1938, 151, 134]. Among these thermochromic materials is the bis(N,N'-diethylethylenediamine)nickel(II)) tetrafluoroborate, $Ni[C_6H_6N_2]_2{\cdot}(BF_4)_2$, a yellow-orange solid with a thermochromic transition to red-orange occurring around 100° C. Traditional syntheses for this class of materials involve dissolving an appropriate metal salt (e.g. $Ni(BF_4)_2$) in anhydrous ethanol and dropwise adding the coordinating dieten organic ligand, wherein the desired solid precipitate forms immediately and irreversibly. Post-synthetic modification of the compound, for examples to alter thermochromic transition temperature, is not believed to have been achieved without the dissolution and subsequent destruction of the material. Thus, to date, such complexes have also exhibited thermochromic transition at a fixed temperature.

A need exists for techniques for low-toxicity thermochromic materials with controllable transition temperature in the vicinity of 100° C.

BRIEF SUMMARY

Tunable thermochromic materials comprise a metal salt with a varying proportion of two different anions and an organic ligand. Partial substitution via doping during the initial synthesis with a macro-structurally similar (generating an isostructural material) yet chemically different anion creates a material with altered thermochromic properties. For example, in bromide-doped bis(N,N'-diethylethylenediamine)nickel(II)) tetrafluoroborate; both the tetrafluoroborate ($BF_4$) and bromide (Br) derivatives are isostructural. Substitution of $BF_4$ for Br causes a decease in the materials' thermochromic transition temperature by approximately 10° C.

In a first embodiment, a tunable thermochromic material comprises a metal salt and two different anions present in a proportion complexed with an organic ligand, wherein varying the proportion changes alters a thermochromic transition temperature of the material. In certain embodiments, the organic ligand is N,N'-ethylethylene diamine (which is termed dieten). In further embodiments, the anions are tetrafluoroborate ($BF_4$—) and bromide (Br—). In still further embodiments, the proportion of bromide ranges from 1 to 25%.

Another embodiment is a method of preparing the material of the first embodiment. A particular aspect involves the use of a nickel(II) metal salts of tetrafluoroborate and bromide in which the proportion of bromide ranges from 1 to 25%.

BRIEF DESCRIPTION OF THE DRAWINGS

FIG. 1 provides a synthetic scheme for the preparation of bromide-doped bis(N,N'-diethylethylenediamine)nickel(II)) tetrafluoroborate having varying proportions of tetrafluoroborate ($BF_4^-$) and bromide ($Br^-$).

DETAILED DESCRIPTION

Definitions

Figure 2:
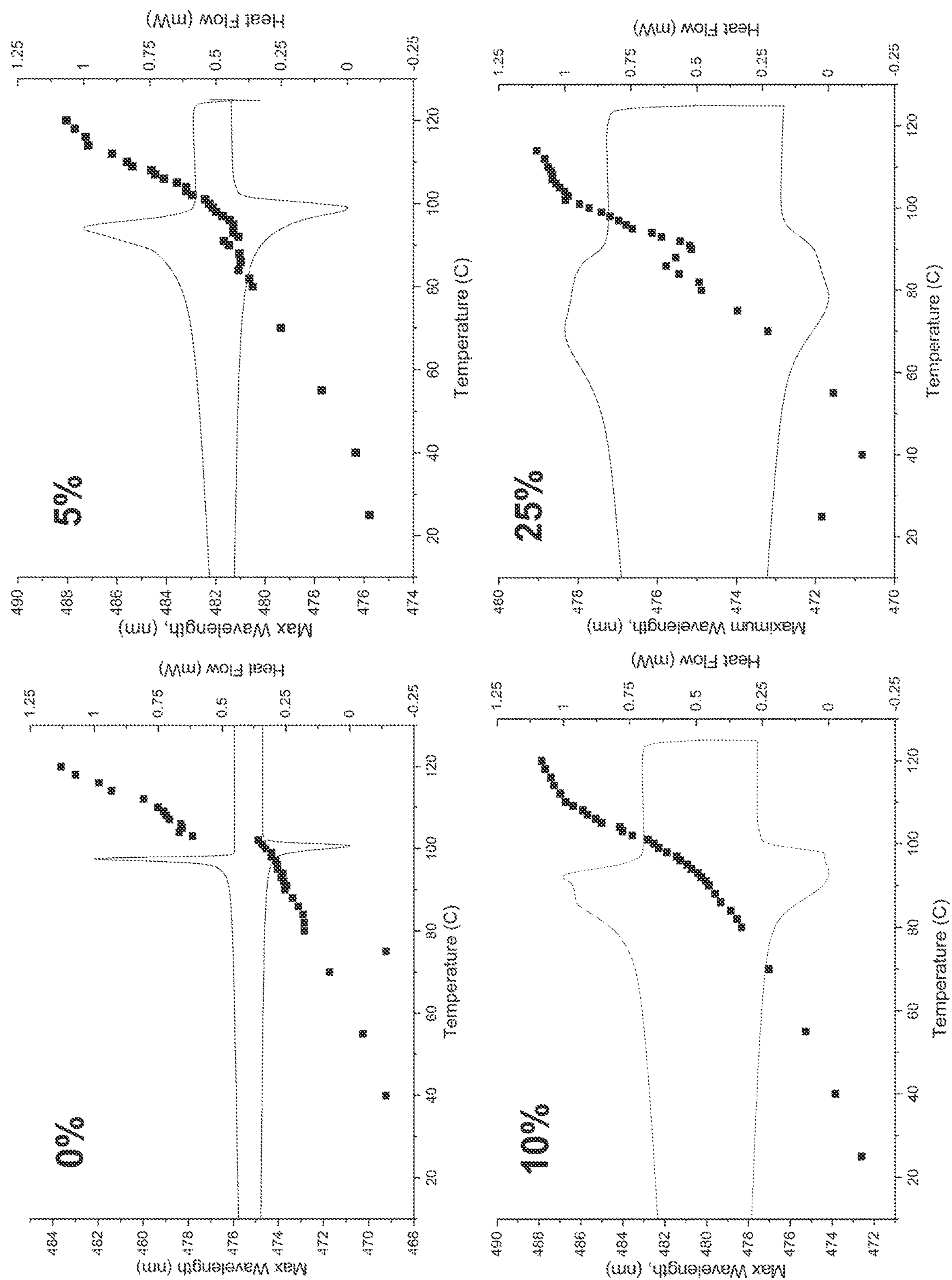
FIG. 2 shows the thermochromic transition temperature depression with increasing percentage of bromide substitution.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

The synthesis of doped thermochromic metal complexes with various divalent metal centers and monovalent anionic lattice moieties is achieved by rapid precipitation from anhydrous alcohol (ROH where R=$CH_3$, $C_2H_5$, etc.) of dissolved metal ions and monovalent anions with the drop-wise addition of N,N'-dialkyl or -arylethylenediamine Generally, two anhydrous alcohol solutions are formed with two different metal salts, with chemical formula $MX_2$ (where M is $Ni^{2+}$ or $Cu^{2+}$ and X=a monovalent anionic species, e.g. $BF_4^-$, $ClO_4^-$, $NO_3^-$ or $Br^-$),such as $Ni(BF_4)_2$, with the same divalent metal specie (e.g. $Ni(BF_4)_2$ and $NiBr_2$). The concentrations of these solutions are added stoichiometrically such that the desired doping percentage of the monovalent anionic species are established. These two solutions are then combined and two equivalents (compared to the $Ni^{2+}$ concentrations) of N,N'-disubstituted diamine is added drop-wise, resulting in almost immediate precipitation of the desired product, which exhibits a reversible thermochromic transition.

Example

Nickel diethylethylenediamine tetrafluoroborate/bromide, $Ni[C_6H_{16}N_2]_2\cdot(BF_4)_{1.5}/(Br)_{0.5}$ was prepared as follows. To a 1 dram glass shell vial, one added 1 mL of 0.5 M $Ni(BF_4)_2$ in anhydrous ethanol, 0.17 mL of 0.5 M $NiBr_2$ in anhydrous ethanol, and 0.830 mL of anhydrous ethanol to form a clear green solution. To that solution, one added 0.094 mL of N,N'-diethylethylenediamine. The yellow-orange solid precipitated almost immediately, was filtered and washed with anhydrous ethanol, and dried at 65° C. overnight in an oven to produce stoichiometric yield.

Additional details are provided in *Inorg. Chem.* 2022, 61, 23, 8834-8842 and accompanying Supporting Information, all of which is incorporated herein by reference for the purposes of disclosing techniques for preparing and analyzing thermochromic complexes.

Further Embodiments

Other monovalent anions may be utilized as the 'matrix' lattice moieties, those which are the majority phase in the material, or the dopant lattice moieties. These anion species may consist of, but are not limited to, compounds containing anions such as $BF_4^-$, $ClO_4^-$, $NO_3^-$, $Br^-$, and $I^-$. The synthetic process remains essentially the same for all combinations of anions, metal centers, and N,N'-disubstituted diamines.

These materials could be used to generate complex unique thermochromic signatures that are easy to read and difficult to mimic, making this technology potentially relevant for document security and anti-counterfeiting measures as well as for other chemical taggant applications.

Advantages

This methodology represents a new way of modifying a family of thermochromic materials through doping various monovalent anionic lattice moieties so as to produce a targeted spectroscopic and colorimetric response. The partial substitution doping is a synthetic alteration to influence the thermochromic transition to lower temperatures in a way that does not fundamentally change the structure or stability of the material itself. Doping in the macro-structurally similar, yet chemically different monovalent anion subtly influences the hydrogen bonding network between the metal complex and the charge-balancing lattice anion, altering the mechanism of thermochromism. Varying the doping percentage creates a variable and tunable spectroscopic signature, wherein the transition temperature decreases with increasing doping percentage.

Current inorganic or hybrid (contains a metal or a metal and organic component) thermochromic materials have several limitations for technological applications relating to their environmental and public health safety and thermochromic transition temperature. Many inorganic thermochromic materials contain mercury, lead, chromium, etc. in high concentrations ($Cu_2[HgI_4]$) or as dopants in less toxic matrices (chromium in aluminum oxide). Further, these materials are often constrained to specific transition temperatures with limited potential for manipulation or suffer from a lack of transition temperature specificity, meaning the transition occurs over a wide temperature regime (tens or hundreds or degrees). The materials described herein represent a class of compounds with temperature specific and optically obvious dramatic changes in color which can be manipulated during synthesis via doping to exhibit thermochromism at variable temperatures while retaining the material properties of the un-doped compound. Also, for example, thermal stability of bis(N,N-diethylethylenediamine)nickel(II) tetrafluoroborate is retained up to 260° C. Taking into consideration all materials within this class of compounds, and the observed 10° C. shift in temperature due to doping a broad range of transition temperatures from 10° C. to 200° C. are feasible.

CONCLUDING REMARKS

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

Pfeiffer, P; Glaser, H. J. Prakt. Chem. 1938, 151, 134.

Thermochromism in Copper(II) Complexes. Structures of the Red and Blue-Violet Forms of Bis(N,N-diethylethylenediamine)copper(II) Perhlorate and the Nonthermochromic Violet Bis(N-ethylethylenediamine)copper (II) Perhlorate." Grenthe, I.; Paoletti, P.; Sandstrom M.; Glikberg S. *Inorg. Chem.* 1979 18. 10. 2687-2692.

What is claimed is:

1. A tunable thermochromic material comprising:

a first instance of an organic ligand complexed with a metal salt; and two different anions present in a first proportion; and a second instance of the organic ligand complexed with the metal salt and the two different anions, wherein the two different anions are present in a second proportion differing from the first proportion, wherein, as a consequence of the different proportions, the first instance has a different thermochromic transition temperature from that of the second instance, wherein the thermochromic transition is reversible with a change in temperature, and wherein the organic ligand is an N,N'-disubstituted diamine.

2. The material of claim 1, wherein the anions are selected from the group consisting of $BF_4^-$, $ClO_4^-$, $NO_3^-$, $Br^-$, and $I^-$.

3. A tunable thermochromic material comprising:

a first instance of N,N'-diethylethylenediamine operating as a ligand and complexed with a metal salt; and two different anions present in a first proportion, wherein the anions are tetrafluoroborate ($BF_4^-$) and bromide ($Br^-$); and a second instance of N,N'-diethylethylenediamine operating as a ligand complexed with the metal salt and the two different anions, wherein the two different anions are present in a second proportion differing from the first proportion, wherein, as a consequence of the different proportions, the first instance has a different thermochromic transition temperature from that of the second instance, and wherein the thermochromic transition is reversible with a change in temperature.

4. The material of claim 3, wherein the metal salt comprises nickel.

5. A method of preparing a tunable thermochromic material, the method comprising:

providing in a first solvent two different anions present in a first proportion and a metal salt;

adding an organic ligand to the solvent, thereby causing a first thermochromic material to precipitate;

providing in a second solvent the two different anions present in a second proportion and the metal salt;

adding the organic ligand to the second solvent, thereby causing a second thermochromic material to precipitate, wherein the first and second thermochromic materials differ only in the proportions of the two different anions, wherein the ligand is an N,N'-disubstituted diamine, and wherein, as a consequence of the different proportions, the first material has a different thermochromic transition temperature from that of the second material, and wherein the thermochromic transition is reversible with a change in temperature.

6. The method of claim 5, wherein the anions are selected from the group consisting of $BF_4^-$, $ClO_4^-$, $NO_3^-$, $Br^-$, and $I^-$.

7. The method of claim 5, wherein the ligand is N,N'-diethylethylenediamine.

8. The method of claim 5, wherein:

the anions are tetrafluoroborate ($BF_4^-$) and bromide ($Br^-$);

the metal salt comprises nickel; and the ligand is N,N'-diethylethylenediamine.

* * * * *